Aug. 3, 1965 D. W. STONE 3,199,008
PLURAL MOTOR SPEED CONTROL BY ARMATURE
VARIATION AND RELATIVE LOAD CONTROL
Filed Sept. 1, 1961 4 Sheets-Sheet 1

INVENTOR.
DAVID W. STONE
BY
Wheeler, Wheeler & Wheeler
ATTORNEYS

INVENTOR.
DAVID W. STONE

INVENTOR.
DAVID W. STONE
BY
Wheeler, Wheeler & Wheeler
ATTORNEYS

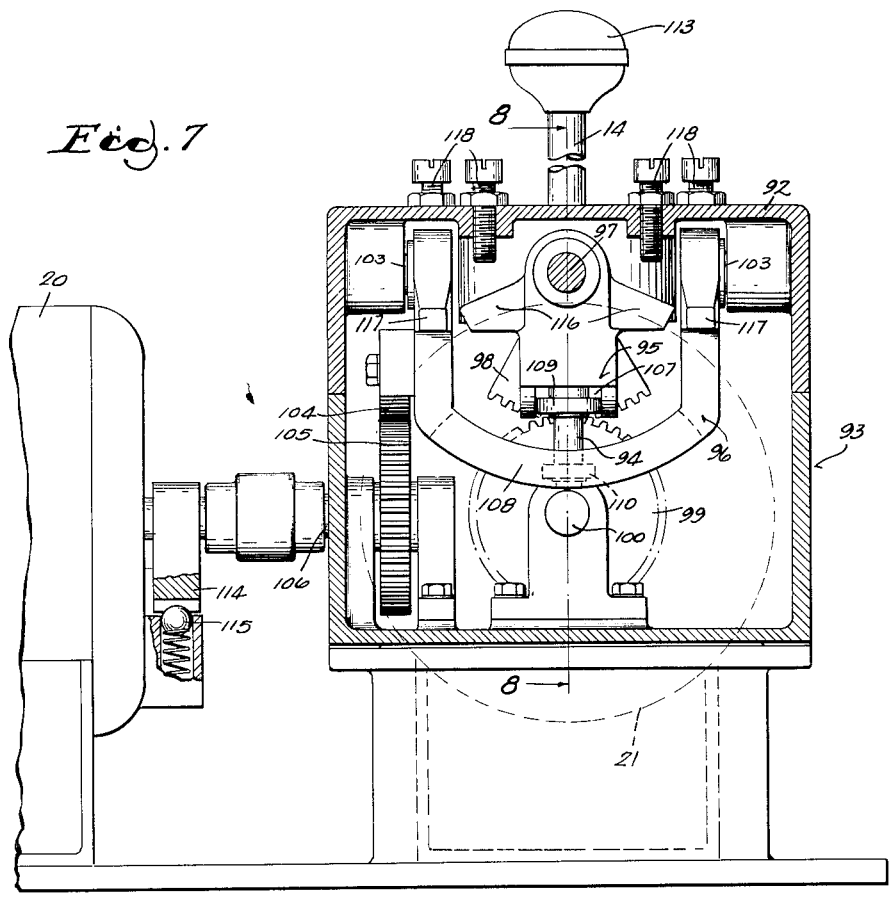
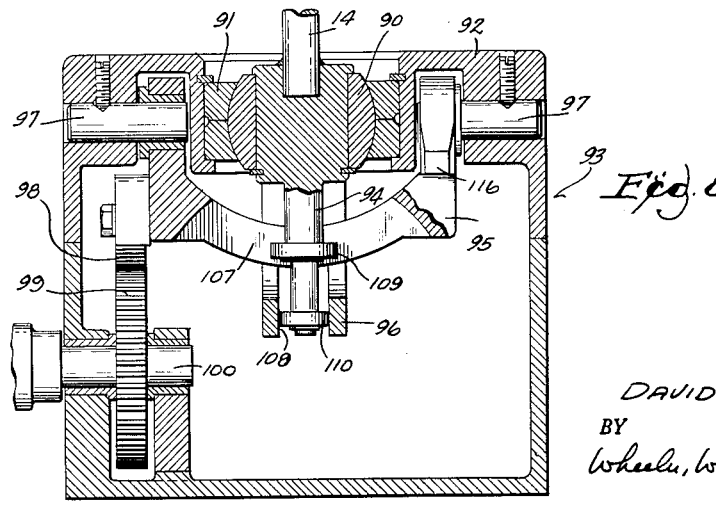

United States Patent Office 3,199,008
Patented Aug. 3, 1965

3,199,008
PLURAL MOTOR SPEED CONTROL BY ARMATURE VARIATION AND RELATIVE LOAD CONTROL
David W. Stone, Milwaukee, Wis., assignor to Harnischfeger Corporation, Milwaukee, Wis., a corporation of Wisconsin
Filed Sept. 1, 1961, Ser. No. 135,573
3 Claims. (Cl. 318—67)

This invention relates to electric motor control apparatus.

While the electric motor control of the present invention is exemplified herein in connection with the coordinated control of the absolute and relative speeds of two electric motors which power the holding line winch and the closing line winch of a travelling crane bucket, the invention is not thus limited and may be applied elsewhere in connection with the coordinated control of the speed of two electric motors.

Heretofore, the holding and closing lines of buckets for cranes and the like have been powered by separately controlled motors. Accordingly, the crane operator has been required to manipulate separate control levers. According to the present invention, however, a single control lever or stick is interconnected with coordinated controls for both the holding line motor and the closing line motor. The single lever or stick is manipulated selectively to operate one or the other of the motor controllers or both concurrently. Accordingly, manipulated of the controller of the present invention is greatly simplified over those heretofore commercially available and an operator can learn the functioning of and become proficient in the use of the instant controller in much less time than has heretofore been required.

In apparatus embodying the present invention, the two motors which are to be selectively run at the same or different speeds each has its own power circuit. The motor controllers interconnected to the control lever comprise signal generators with their outputs connected to impose control signals on the power circuits. The signal from one signal generator equally affects both motors to uniformly control the absolute speed thereof. The signal from the other generator has a differential or non-uniform effect upon the two motors and controls the relative speeds thereof.

Two embodiments of the invention are disclosed herein. In one embodiment the signal from said other generator is concurrently imposed on both power circuits and has opposite effects thereon. In the other embodiment, the signal from said other circuit is imposed on only one of the power circuits.

Other objects, features and advantages of the invention will appear from the following disclosure in which:

FIG. 6 is a plan view of the stick controller showing its relationship to the two signal generators controlled thereby.

FIG. 7 is a vertical cross section taken through the stick controller to expose internal details.

FIG. 8 is a cross section taken along the line 8—8 of FIG. 7.

The invention as embodied in the circuit diagram of FIG. 3 will first be described. The showing of the typical bucket of FIG. 1 and the physical structure of the controller, signal generators, etc., of FIGS. 7 and 8 are common to all embodiments.

Figure 1:
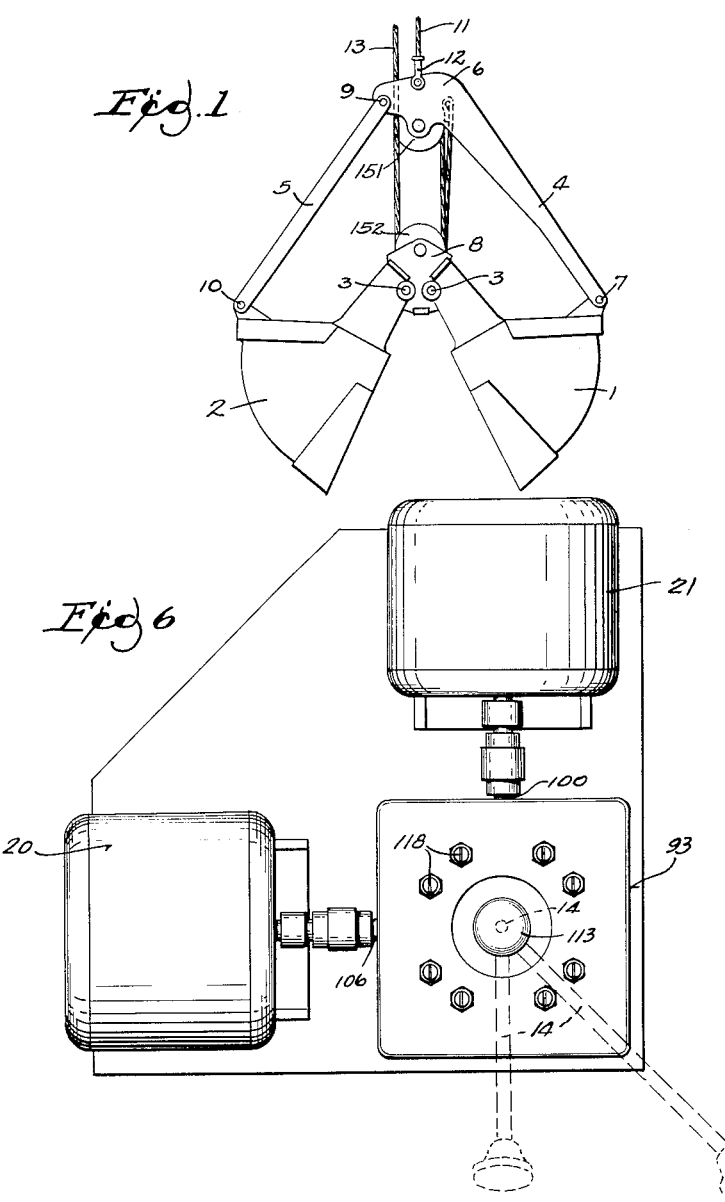
FIG. 1 illustrates a typical clam shell bucket of the type used with travelling cranes.

No change is made in the bucket construction, nor in the hoisting lines. A conventional bucket is shown in FIG. 1 and consists of clam shells 1, 2. The respective shells are pivoted to the pulley block 8 on the hinge pins 3 and are each respectively pivoted to the arms 4, 5 of a lift bracket 6. There are pivot pins at 7, 9 and 10, about which the various parts will articulate in the course of opening and closing the clam shells 1 and 2.

The weight of the bucket and its load is shared by the holding line 11, which has a fixed connection at 12 to the lift bracket 6 and the closing line 13, which is connected through pulleys 151, 152 with the clam shell pulley block 8 and lift bucket 6. The clam shells are closed by drawing in or hoisting the closing line 13 with respect to bracket 6. When the clam shells are completely closed, any further hoisting on the closing line 13 will help lift the bucket and the construction is such that the respective lines 11, 13 are expected to share the load substantially equally as the load is lifted.

To open the bucket, the closing line 13 is slacked off and the clam shells 1, 2 will open of their own weight to dump the load. During this operation, the entire weight of the bucket and load must be sustained by the holding line 11.

From the foregoing, it is clear that hoisting and lowering of the bucket involves the controlled operation of two hoisting motor-operated winches, one for each of lines 11, 13, and that to open or close the bucket, the hoist winch for line 13 must be actuated at a different rate than the winch for the holding line 11, in order to give relative motion between lines 11, 13.

Figure 2:
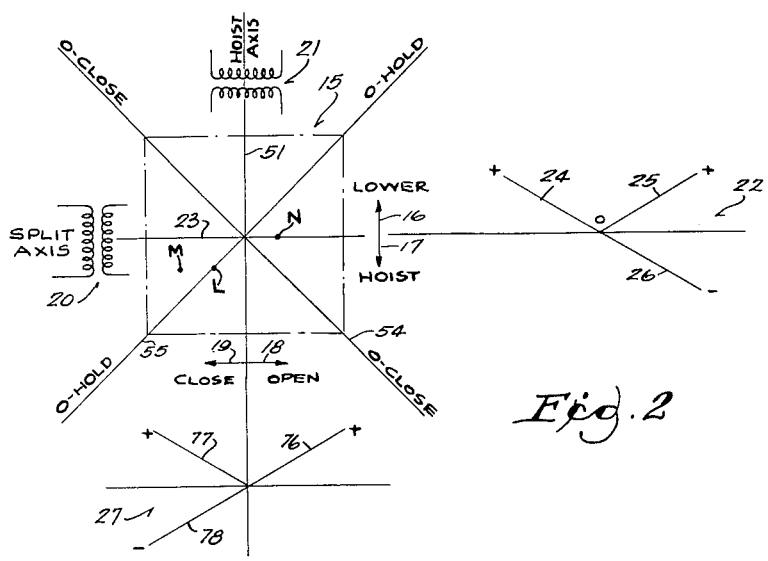
FIG. 2 is diagrammatic illustration of the pattern through which the control stick or lever is movable, voltage graphs indicating the voltage output of the respective signal generators coupled to the stick being shown in connection therewith.

The control handle or stick 14 is universally movable to any position within the substantially square outline or position pattern diagrammatically shown and numbered 15 in FIG. 2. The mechanism of the stick 14 and its coupling to the signal generators 20, 21 is shown in greater detail in FIGS. 6 through 8. For convenience in explanation, the two major axes of stick movement are indicated in pattern 15 as the hoist axis 51 and the split axis 23.

As best shown in FIG. 8, the stick 14 is oscillatable universally on a ball joint 90 in the ball bearing 91 seated in a well in the top wall 92 of the housing of the controller 93. Stick 14 has an extension 94 projecting downwardly beyond the ball 90. Extension 94 engages two yokes 95, 96, which oscillate on transverse axes. Yoke 95 turns on the trunnions 97 axially aligned with the center of rotation of ball 90. Yoke 95 also carries on one leg a sector pinion 98 having teeth concentric with the axis of trunnions 97 and meshing with the gear 99 on the shaft 100 of signal generator or master 21.

Yoke 96 oscillates on trunnions 103 which are also axially aligned with the center of rotation of the ball 90. Yoke 96 carries on one leg a sector pinion 104 having teeth concentric with the axis of trunnions 103 and meshing with gear 105 on the shaft 106 of signal generator or master 20.

The respective yokes 95, 96 have slotted arcuate bridge portions 107, 108, both concentric with the axis of ball rotation, and in which the bearing discs 109, 110 of the stick extension 94 ride. Accordingly, when stick 14 is manipulated by its knob 113 along the hoist axis 51 of pattern 15 of FIG. 2, thus to oscillate the yoke 96 and rotate the shaft 106 of the hoist generator 20, disc 109 on stick shaft extension 94 will simply slide in the slot in the bridge 107 of yoke 95 and no motion will be imparted thereto. If the stick 14 is manipulated to move along the split axis 23 of pattern 15 of FIG. 2, thus to oscillate yoke 95 and turn shaft 100 of the split generator 21, disc 110 will simply slide in the slot of bridge 108 of the yoke 96 without imparting motion thereto. If the stick 14 has a component of motion along both the hoist axis 51 and split axis 23, both yokes will be concurrently oscillated about their respective trunnions to concurrently transmit motion through their sector pinions to the shafts 100, 106.

The legs of yokes 95, 96 respectively have stop abutments 116, 117 which will stop against the adjustable set screws 118 to limit yoke oscillation and rotation of the shafts 100, 106.

The signal generators or masters 20, 21 are of the same general construction shown in Jacobs et al. United States Patent 2,490,620. The shaft of each master may be provided with a notched segment 114 in which the spring-pressed ball 115 will be received to assist the operator in establishing the neutral position of each master. Segment 114 may have more than one notch to indicate other positions of the respective masters off neutral.

Figure 3:
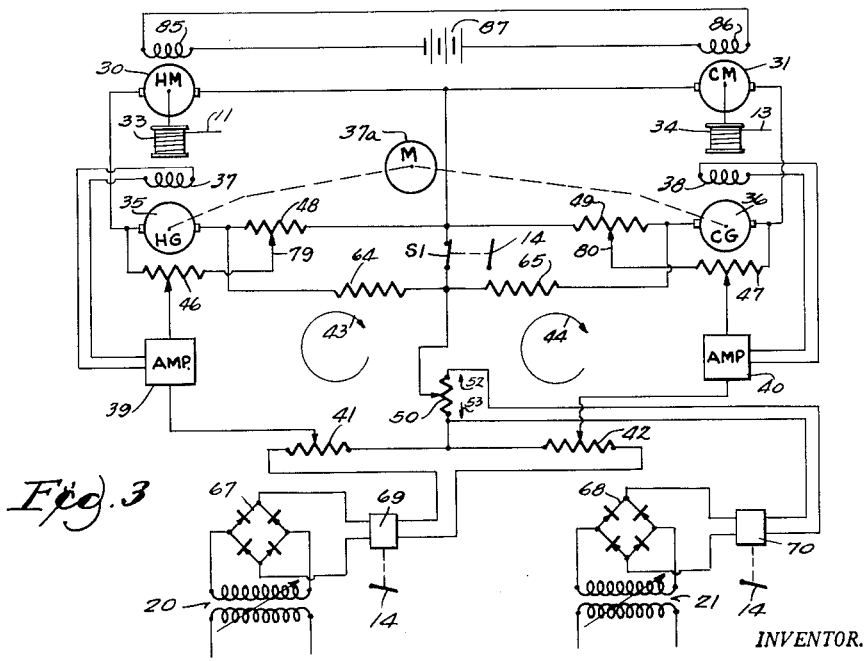
FIG. 3 is a simplified schematic electric circuit diagram of one embodiment of the invention.

When the stick 14 has any component of movement along hoist axis 51, signal generator 20, to which it is coupled, will produce a signal output imposed on the circuit shown in FIG. 3 to vary the absolute speed of lines 11, 13. This control is asserted substantially uniformly on both lines 11, 13. For example, if stick 14 is moved in the direction of arrow 16, both the closing line and the holding line will be paid out. If the stick 14 is moved in the direction of arrow 17, the lines 11, 13 will both be drawn in.

When the handle 14 has any component of movement along split axis 23, signal generator 21 to which it is coupled will produce a signal output imposed on the circuit of FIG. 3 to vary the relative speed of the lines 11, 13. For example, if stick 14 is moved in the direction of arrow 18, and regardless of whether the lines 11, 13 are lifting or lowering, generator 21 will signal the control circuit for the motors coupled to the winches for the holding line 11 and closing line 13 to pay out the closing line with respect to the holding line, thus to open the bucket. If the handle or stick 14 is moved in the direction of arrow 19, the closing line 13 will be drawn in with respect to the holding line 11 to close the bucket.

For convenience in explanation, the generator 20 which responds to movement of the stick 14 along the hoist axis 51 will be referred to as the hoist generator or "master" and the generator 21 which responds to movement of the joy stick along the split axis 23 will be referred to as the split generator or "master." As used herein, the term "split" means that a signal is imposed on the control circuit to cause the lines 11, 13 to have relative movement.

The respective generators or masters 20, 21 deliver a variable alternating current voltage, depending upon the mutual inductance of the stationary coils thereof, as modified by a non-homogeneous rotor, as shown in Jacobs et al. United States Patent 2,490,629. The A.C. voltage output is converted into D.C. voltage by bridge-type rectifiers 67, 68 (FIG. 3). The zero point of the hoist master 20 is shown in the voltage graph 22 of FIG. 2, when the stick 14 is anywhere along the split axis 23 in the pattern 15. When the stick moves along hoist axis 51 in the direction of arrow 16, an increasing positive D.C. voltage is generated as indicated by the line 24 in graph 22. When the stick is moved along hoist axis 51 in the direction of arrow 17, a corresponding increasing positive D.C. voltage is generated as shown by the line 25 in graph 22. However, this voltage is inverted by conventional inverting switch 69 of FIG. 3 so that any output of the generator 20 when the stick 14 is moved in the direction of arrow 17 is an increasing negative quantity as shown by the line 26 of graph 22. Switch 69 is coupled to stick 14 to invert the voltage signal from generator 20 whenever the stick is below the split axis 23 in pattern 15 of FIG. 2.

The same is true of the output of the split master 21, as shown in the wave form diagram 27 of FIG. 2. Movement of the stick 14 along split axis 23 in the direction of arrow 18 produces a positive voltage output shown as curve 76. Movement of the stick along split axis 23 in the direction of arrow 19 produces a positive voltage shown as curve 77. Switch 70 is coupled to stick 14 to invert the voltage signal from generator 21 whenever the stick is to the left of hoist axis 51 in FIG. 2.

The control circuitry for the holding line motor 30 and closing line motor 31 in this embodiment is shown in simplified form in FIG. 3. Motors 30, 31 are respectively coupled on their shafts to holding line winch drum 33 and closing line winch drum 34. Motors 30, 31 are D.C. shunt motors with fixed energization of shunt fields 85, 86 supplied from a conventional separate source shown for convenience in FIG. 3 as battery 87. The armature of holding line motor 30 is energized by the holding line motor generator 35 and the armature of closing line motor 31 is energized from the closing line motor generator 36. Each generator 35, 36 is driven at a constant speed from A.C. motor 37a. The composite load on motor 37a is the sum of the loads on the motors 30, 31 based upon the degree of energization thereof from the respective generators 35, 36. The foregoing will be recognized as a form of Ward-Leonard control.

The respective generators 35, 36 have separately excited D.C. fields 37, 38, which are respectively controllably excited by amplifiers 39, 40 having D.C. output. Amplifiers 39, 40 are conventional and may be electronic or magnetic. The degree of excitation of each field 37, 38 will affect the output of the generators 35, 36 to the armatures of the respective motors 30, 31, and hence will affect the speed of the motors and of the holding line 11 and closing line 13.

Considering first only the affect of the hoist signal generator 20, the output of the amplifiers 39, 40 will depend upon the voltage impressed on the circuit by the hoist generator 20 and the "feedback" voltages from resistors 46, 47, 48, 49. Both amplifiers 39, 40 will be affected in the same way by reason of any change in signal from the hoist master 20 and the amplifiers will correspondingly control the absolute speed of the motors 30, 31.

The signal from the hoist master 20 is impressed across a resistance network including resistors 41, 42. Current flowing through these resistors will cause a voltage drop therethrough which will be impressed on the amplifiers 39, 40 and correspondingly excite the field windings 37, 38. The loop circuits which include amplifiers 39, 40 are indicated generally by the circular arrows 43, 44 in FIG. 3 and include portions of the adjustable resistors 46, 47, adjustable resistors 48, 49 and the variable resistor 50 which is in a circuit leg common to both loop circuits 43, 44.

The "feedback" voltages aforesaid derive from several sources. Feedback voltages appearing across resistors 46 and 47 result from current flow therein caused by the voltage output of generators 35, 36. Feedback voltages appearing across resistors 48, 49 result from current flow through the armatures of motors 30, 31. This latter current, of course, also derives from generators 35, 36, but because of voltage drop in the armature of motors 30, 31, the circuit connections from the generators to the motors, etc., will be a different value than the currents flowing in resistors 46, 47. In loop circuits 43, 44, the "feedback" voltages across resistors 48, 49 buck or oppose the feedback voltages across resistors 46, 47. This has a speed regulating effect on the motors 30, 31, because the "feedback" voltages aforesaid are superimposed on the amplifiers 39, 40, in loop circuits 43, 44.

By way of example, the sum of the voltages across resistors 50 and 41 in loop circuit 43 causes a control current to flow in amplifier 39 which will determine the strength of generator field 37. The resultant voltage output of generator 35 is of such a polarity that the current flow resulting therefrom and which flows in resistor 46 will develop a "feedback voltage" in resistor 46 in circuit loop 43 which is opposed in polarity to the sum of the voltages derived from resistors 50, 41 and hence reduces the current flowing in amplifier 39. Thus the output of generator 35 is controlled by the composite action of the hoist master 20 and split master 21 on resistors 50, 41, and the "feedback voltage" across resistor 46 stabilizes the control currents in circuit 43 at useful values.

To compensate for losses in the circuit components and connections between generator 35 and motor 30, the "feedback voltage" across resistor 48 increases as the output of generator 35 increases and is of the same polarity as the composite voltage derived from resistors 50, 41. Resistor 48 can be adjusted so that the voltage drop thereacross exactly balances the voltage drop in the circuit from generator 35 to motor 30 caused by load current, thus cancelling out the effect of such losses. Resistors 47 and 49 function in a similar fashion in loop circuit 44.

The "feedback" voltage drops in the resistors 48, 49 caused by the current circulating in the respective armatures of the motors 30, 31, and the "feedback" voltage drops in resistors 46, 47 caused by the output of generators 35, 36, will respectively add to the voltages drops across the resistors 41, 42, the algebraic sum total of all such voltages being imposed respectively on the amplifiers 39, 40. The value of feedback voltages developed across resistors 46, 47, 48, 49 can be regulated by adjustment of the resistors so that the voltage impressed upon motors 30, 31 will be independent of the current that flows through them.

The resistors 46, 47, 48 and 49 will be so adjusted that when the stick 14 is at the exact center of the pattern 15, winches 33, 34 will be at standstill. Conventional mechanical brakes can be provided to brake the winches 33, 34 in this position. If the stick 14 is somewhere else along split axis 23, the hoist master 20 remains in "neutral," but the split master 21 is effective to cause relative movement of the lines 11, 13, as will hereinafter appear.

Accordingly, any output of the hoist master 20, either positive or negative, depending on movement of stick 14 along hoist axis 51 in the direction either of arrows 16, 17 will change the voltage drop across resistors 41, 42 and concurrently change the excitation to the motors 30, 31 to either raise or lower both of the lines 11, 13 at the same rate.

The foregoing description, primarily limited to the action of the hoist generator 20, assumes that the stick 14 is moved only along the hoist axis 51 in the pattern 15. If the stick 14 has any component of movement along the split axis 23, either in the direction of arrow 18, or the direction of arrow 19, the split master 21 will impress a voltage across the resistor 50 in the circuit of FIG. 3 and change the currents flowing in both of the respective loop circuits 43, 44 and the net voltages impressed on amplifiers 39, 40. Any current flowing through the resistor 50 resultant from voltage impressed thereon by the split master 21 will cause an equal and opposite reaction in the respective loop circuits 43, 44 and in the respective amplifiers 39, 40.

If, for example, the stick 14 is moved along the split axis 23 in the direction of arrow 18, a voltage is impressed on the resistor 50 which is polarized in one direction to so excite the amplifier 40 to cause the closing line motor to pay out with respect to the holding line motor so as to open the clam shells 1 and 2. Assuming by way of example that by reason of the signal delivered to the circuit by the hoist master 20, both lines 11, 13 are paying out, thus to lower the bucket, and the stick 14 is moved along the split axis 23 in the direction of arrow 18, the closing line motor 31 will pay out faster than the holding line motor 30, thus to open the bucket. If, on the other hand, the stick 14 is moved along the split axis 23 in the direction of arrow 19 while the bucket is being lowered, the closing line motor 31 will pay out line 13 less rapidly than will the holding line motor 30 pay out holding line 11, thus to close the bucket while it is descending.

For closing, the resistance 50 will be subject to a polarity in the direction of arrow 52 on FIG. 3 and for opening, the polarity will be in the direction of arrow 53. In one case, the total current flowing in one of the loop circuits 43, 44 will be increased over the other and in the opposite case the reverse will be true to give the differential action aforesaid and to cause relative movement of the lines 11, 13.

Assume by way of another example that the stick 14 has been moved in the direction of arrow 17 to hoist both lines 11, 13 and the stick is also concurrently moved in the direction of arrow 19 to close the clam shells 1 and 2. Under these circumstances, both the holding line 11 and closing line 13 initially will concurrently exert hoisting force on the bucket, until the bucket is closed. However, since the closing line motor is turning faster than the holding line motor because it is energized at a higher rate than the holding line motor, as soon as the bucket is closed, the closing line motor will assume all of the weight of the load and the holding line will become slack. In order for the holding line motor and closing line motor to carry equal loads, the stick must be advanced along the axis 51 in pattern 15. If it is to the left of the axis 51 in the pattern, the closing line will attempt to raise the bucket by itself and if it is to the right of the axis 51 in the pattern 15, the bucket will open and the holding line will bear the weight of the bucket and of the load until the load falls out.

To insure even loading on both motors 30, 31 and their respective lines 11, 13 when stick 14 moves on axis 51 of pattern 15, the circuit of FIG. 3 is augmented with resistors 64, 65, which substitute for resistors 48, 49 in the loop circuits 43, 44 as "feedback voltage" resistors when switch S1 is open. Switch S1 is connected to the stick 14 and will open whenever stick 14 is moved to a position below split axis 23 in pattern 15. Resistors 48, 49 remain in the circuits to the armatures of motors 30, 31, but only those portions thereof between their sliding contacts 79, 80 and the connections to resistors 64, 65 remain in loop circuits 43, 44.

With switch S1 open, there will be a net potential difference caused by the sum of the voltage drops across resistances 48, 49, which will cause a current to circulate in the loop circuit including resistors 48, 49, 64, 65. If the ohmic value of each resistors 64, 65 is the same, the voltage drop caused by this circulating current will always divide equally between the resistors 64, 65 so that the "feedback voltage" impressed on loop circuits 43, 44 and ultimately on amplifiers 39, 40 to compensate for losses will be the same in both loop circuits 43, 44 if switch S1 is open, but may be different if switch S1 is closed.

For example, if the holding line motor 30 is more heavily loaded than the closing line motor 31 and thus there are more losses in the circuit to motor 30 than in the circuit to motor 31, the voltage drop across resistor 48 is larger than that across resistor 49. If switch S1 were closed, this would increase the signal to amplifier 39 (as compared to the signal to amplifier 40) and thus increase the output of generator 35 to motor 30 to compensate for the larger losses in the circuit to motor 30 so that motor 30 could continue to sustain the heavier load. But if switch S1 is open, the voltage fed back to circuit 43 is no greater than to circuit 44 (resistors 64, 65 being equal). This results in a feedback voltage signal to amplifier 39 which is insufficient to compensate for losses in the circuit to motor 30. The voltage applied to the armature of motor 30 will accordingly drop and the motor 30 will slow down. Conversely, the closing line motor 31 will speed up until the loads borne by the motors 30, 31 are equal.

As indicated in pattern 15, if the stick 14 is anywhere along diagonal "O-Hold" line 55, the holding line will remain stationary or at zero speed. If the stick 14 is anywhere along "O-Close" line 54, the closing line will remain stationary or at zero speed. Where the lines intersect at the center of the pattern, both lines will be at zero speed. If the stick 14 is anywhere else in the pattern 15, the holding line and closing line will be moving either up or down, depending on the point selected. Several simplified examples will now be given by way of illustration. In these simplified examples, maximum parameters of speed and voltage have a value of 1 and all other values are relative thereto:

(1) With the stick 14 at point L in pattern 15 of FIG. 2, the output of hoist master 20 is ⅓ hoist and the output of the split master 21 is ⅓ close. The voltages across the resistors in the circuit of FIG. 3 can be said to be as follows:

Resistance 41 _____ ⅓ volt, plus on left.
Resistance 42 _____ ⅓ volt, plus on left.
Resistance 50 _____ ⅓ volt, plus on top.

Holding speed is proportional to the sum of voltages across resistor 41 and 50:

$$(+⅓) \text{ volt} + (-⅓) \text{ volt} = 0 \text{ speed}$$

Closing speed is proportional to the sum of voltages across resistors 50 and 42:

$$(+⅓) \text{ volt} + (+⅓) \text{ volt} = ⅔ \text{ speed}$$

Accordingly, at point "L," the holding line is at standstill and the closing line is closing at ⅔ rated speed.

(2) With the stick 14 at point "M" on the pattern 15, the output of the hoist master is ⅓ hoist and the ouput of the split master is ⅔ close. The voltages across the resistors can be said to be as follows:

Resistance 41 _____ ⅓ volt, plus on left.
Resistance 42 _____ ⅓ volt, plus on left.
Resistance 50 _____ ⅔ volt, plus on top.

Holding speed is proportional to the sum of voltages across resistors 41 and 50:

$$(+⅓) \text{ volt} + (-⅔) \text{ volt} = -⅓ \text{ speed}$$

Closing speed is proportional to the sum of voltages across resistors 50 and 42:

$$(+⅔) \text{ volt} + (+⅓) \text{ volt} = 1 \text{ speed}$$

Accordingly, at point "M," the holding line is going down while the closing line is going up.

(3) With the stick 14 at point "N," the output of the hoist master is zero and the output of the split master is ⅓ open. The voltages across the resistors can be said to be:

Resistance 41 _____ zero volts.
Resistance 42 _____ zero volts.
Resistance 50 _____ ⅓ volt, plus on bottom.

Holding speed is proportional to the sum of voltages across resistors 41 and 50:

$$0 \text{ volts} + (+⅓) \text{ volt} = ⅓ \text{ speed}$$

Opening speed is proportional to the sum of voltages across resistors 50 and 42:

$$(-⅓) \text{ volt} + 0 \text{ volts} = -⅓ \text{ speed}$$

Accordingly, at point "N," the holding line is raising and the closing line is falling, thus to open the bucket.

Similar examples could be given for any point in pattern 15.

From the foregoing, it is clear that in the FIG. 3 embodiment of the invention just described, the split generator or master 21 has a substantially equal and opposite effect on both motors 30, 31 for both lines 11, 13. In the embodiment of the invention shown in FIG. 4, the split generator or master 21 affects only the motor 31 and the closing line 13. It has no effect on motor 30 and line 11. However, the relative speeds of the two lines 11, 13 is nevertheless affected.

Figure 4:
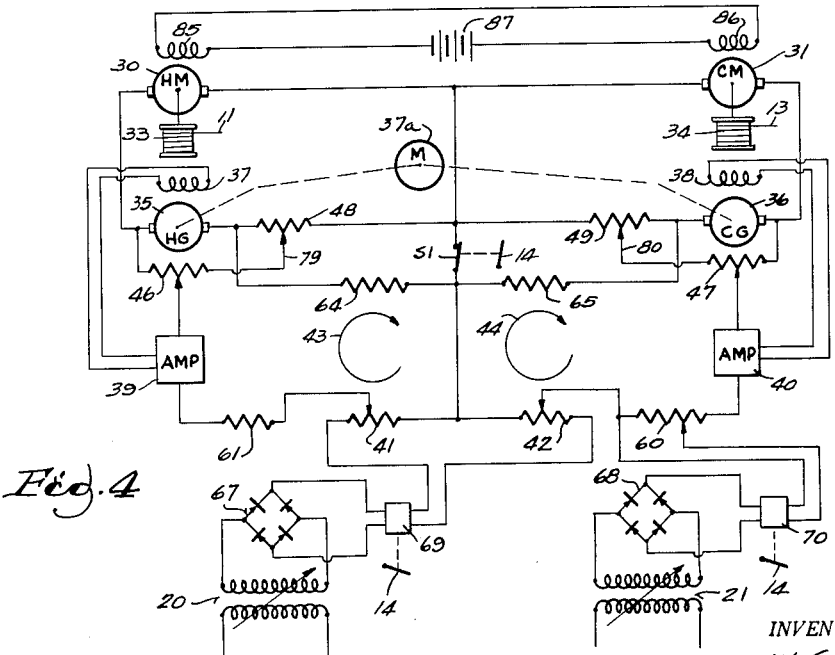
FIG. 4 is a simplified schematic electric circuit diagram of another embodiment of the invention.

These portions of the circuit of FIG. 4 which are also shown in FIG. 3 will not be redescribed. Similar parts have been given similar reference characters. In the circuit of FIG. 4 there is no resistor 50 as shown in FIG. 3 and the output of split generator 21 is imposed on variable resistor 60 which in loop circuit 44 is in series with resistor 42. To balance resistor 60, loop 43 is provided with an additional resistor 61.

The hoist and split generators 20, 21 may be identical with those hereinbefore described and have the same output voltage curves shown at 22, 27 in FIG. 2. These curves are not reproduced in FIG. 5.

Any movement of the stick 14 along the split axis 23 in either of the directions of arrows 18, 19 will result in the imposition of a voltage on the resistor 60 in loop circuit 44. Such movement will have no effect on the loop circuit 43. Accordingly, only the absolute speed of motor 31 will be affected by the split generator 21 in the FIG. 4 embodiment.

Figure 5:
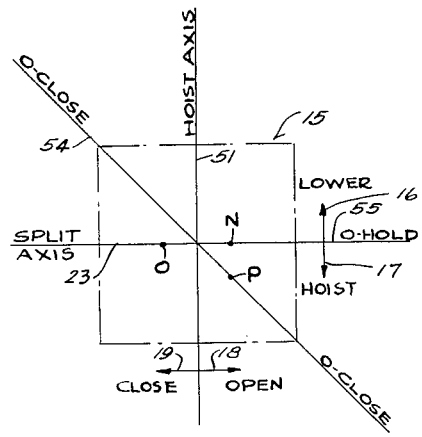
FIG. 5 is a diagrammatic showing of the stick pattern appropriate for the circuit of FIG. 4.

In practical effect, the circuitry of FIG. 4 will result in shifting the "O-Hold" line 55 from its diagonal position as shown in FIG. 2 to its position shown in FIG. 5 where it coincides with the split axis 23. This has certain advantages, particularly when the bucket is opened by moving the stick 14 to the right along the split axis 23, as is normally the case. In the circuit of FIG. 4, this automatically moves the stick along the "O-Hold" line 55. The holding line brake is normally engaged whenever stick 14 is on split axis 23. Accordingly, the hold line motor 30 is unloaded. Recall that at point "N" in the pattern of FIG. 2, the holding line is rising while the closing line is paying out. For a similar point "N" in the pattern 15 as shown in FIG. 5, the holding line will have zero speed at point "N," while the closing line is paying out, this tending to reduce the overall load on the holding line motor 30.

Additionally typical simplified examples similar to those heretofore presented in connection with FIG. 2 will now be given in connection with FIG. 5. In these simplified examples, maximum parameters have a value of 1 and all other values are relative thereto:

(1) With the stick 14 at 0 in pattern 15 of FIG. 5, the output of hoist master 20 is 0 hoist and the output of split master 21 is ⅓ close. The voltages across the resistors in the circuit of FIG. 4 can be said to be as follows:

Resistance 41 _____ 0 volts.
Resistance 42 _____ 0 volts.
Resistance 60 _____ ⅓ volt, plus on left.

Holding speed is proportional to the voltage across resistor 41:

$$0 \text{ volts} = 0 \text{ speed}$$

Closing speed is proportional to the sum of voltages across resistors 60 and 42:

$$(+⅓) \text{ volt} + 0 \text{ volts} = +⅓ \text{ speed}$$

Accordingly, at point "O," the holding line is at a standstill and the closing line is closing at ⅓ rated speed.

(2) With the stick 14 at point "P" in pattern 15 of FIG. 5, the output of hoist master 20 is ⅓ hoist, and the output of split master 21 is ⅓ open. The voltages across the resistors in the circuit of FIG. 4 can be said to be as follows:

Resistance 41_____ ⅓ volt plus on left.
Resistance 42_____ ⅓ volt plus on left.
Resistance 60_____ ⅓ volt plus on right.

Holding speed is proportional to the voltage across resistance 41:

$$(+\tfrac{1}{3}) \text{ volt} = +\tfrac{1}{3} \text{ speed}$$

Opening speed is proportional to the sum of the voltages across resistors 60 and 42:

$$(-\tfrac{1}{3}) \text{ volt} + (+\tfrac{1}{3}) \text{ volt} = 0$$

Accordingly, at point "P," the holding line is rising at ⅓ speed and the closing line is at standstill.

Similar examples could be given for any point in pattern 15 of FIG. 5.

By way of example and not of limitation, and in practical embodiments of the invention, resistors 48 and 49 are each rated at .01 ohm, resistors 46 and 47 are each rated at 600 ohms, resistors 64, 65 are each rated at 10 ohms, and resistors 41, 42, 50, 60 and 61 are each rated at 1000 ohms.

I claim:

1. Control apparatus for control of the speeds of two electric motors having fixed field circuits and variable armature circuits comprising:
    first and second armature power supply circuits for said first and second motors;
    first and second sources of control signal voltage for said circuits, said circuits comprising means for substantially uniformly affecting the armature circuits and the absolute speeds of both motors in response to a signal from said first source and for differentially affecting the armature circuits and the absolute speeds of both motors in response to a signal from said second source; and
    means responsive to unequal loading on said motors when they are hoisting, to increase the output of said power supply circuit for the underloaded motor and to decrease the output of said power supply circuit for the overloaded motor to load said motors equally, said means comprising means sensitive to the total losses in the armature circuits providing signals to said power supply circuits tending to balance the losses.

2. In a crane having a bucket with a holding line and a closing line, control apparatus for controlling the speeds of said lines and including:
    a control stick;
    two signal generators controlled by movement of said stick;
    a motor for operating each of said lines having a fixed field circuit and a variable armature circuit and power circuits for said armature circuits responsive to said signal generators for energizing said motors;
    said control stick having a positional pattern within which said stick is universally movable and having perpendicularly transverse main axes of movement and having transverse secondary axes of movement angularly displaced from said main axes;
    and motion transmitting connections from said stick to said generators for transmitting motion to one generator when the stick is moved along one axes to affect the armature circuits and absolute speeds of both motors and for transmitting motion to the other generator when said stick is moved along the other main axis to differentially affect the armature circuits and absolute speeds of both motors, and for transmitting motion to both generators when the stick is moved along said secondary axes of movement to render one or the other of said motors stationary.

3. Control apparatus for control of the speeds of two electric motors having fixed field circuits and variable armature circuits comprising:
    first and second armature power supply circuits for said first and second motors; said power supply circuits including first and second amplifiers for said first and second motors;
    first and second sources of control signal voltage for said power supply circuits, said circuits comprising means for substantially uniformly affecting the armature circuits and absolute speeds of both motors in response to the signal from said first source and for differentially affecting the armature circuits and absolute speeds of both motors in response to a signal from said second source;
    said power supply circuit including means for feeding back control voltage from the armature circuit of each of said motors to the respective amplifier to compensate for losses in the motor circuit and including means responsive to unequal loading on said motors when they are hoisting to increase the output of the respective amplifier to the armature circuit for the underloaded motor and to decrease the output of the respective amplifier to the armature supply circuit for the overloaded motor, said means comprising means sensitive to the total losses in the armature circuits of both motors providing signals to said amplifiers tending to balance the total losses between the two armature circuit.

References Cited by the Examiner

UNITED STATES PATENTS

| | | | |
|---|---|---|---|
| 696,247 | 3/02 | Leonard | 318—80 |
| 822,250 | 6/06 | Day | 318—80 X |
| 1,850,772 | 3/32 | Raube | 214—656 |
| 1,861,994 | 6/32 | Wickerham | 37—184 |
| 1,881,011 | 10/32 | Wittkuhns | 318—80 |
| 2,422,117 | 6/47 | Mercier | 318—51 |
| 2,443,048 | 6/48 | McComb | 318—67 |
| 2,614,392 | 10/52 | Bechberger et al. | 318—19 X |
| 2,714,696 | 8/55 | Mathias | 318—67 X |
| 2,875,388 | 2/59 | Scheu | 318—67 X |
| 2,894,230 | 7/59 | Murphy | 336—30 |
| 2,895,086 | 7/59 | Pettit | 336—30 X |
| 2,920,776 | 1/60 | Srnka | 214—656 |
| 3,084,805 | 4/63 | McKinnon | 318—67 X |
| 3,122,970 | 3/64 | Rhoades | 336—30 X |

FOREIGN PATENTS 142,173   7/51   Australia.

ORIS L. RADER, *Primary Examiner.*